United States Patent
Bruno et al.

(10) Patent No.: US 12,014,595 B2
(45) Date of Patent: *Jun. 18, 2024

(54) INTERACTIVE TOKEN SYSTEM

(71) Applicant: Universal City Studios LLC, Universal City, CA (US)

(72) Inventors: Dante Lamar Bruno, Orlando, FL (US); Matthew Miller, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/184,235

(22) Filed: Mar. 15, 2023

(65) Prior Publication Data

US 2023/0222869 A1 Jul. 13, 2023

Related U.S. Application Data

(63) Continuation of application No. 17/335,635, filed on Jun. 1, 2021, now Pat. No. 11,610,451.

(Continued)

(51) Int. Cl.
*G07F 17/32* (2006.01)
*G06Q 20/32* (2012.01)
(Continued)

(52) U.S. Cl.
CPC ....... *G07F 17/3225* (2013.01); *G06Q 20/321* (2020.05); *G07F 5/10* (2013.01);
(Continued)

(58) Field of Classification Search
CPC ............ G07F 17/3225; G07F 17/3211; G07F 17/3223; G07F 17/3248; G07F 17/3251;
(Continued)

(56) References Cited

U.S. PATENT DOCUMENTS 8,205,158 B2 6/2012 Ganz et al.
8,250,796 B2 8/2012 Padgett et al.
(Continued)

FOREIGN PATENT DOCUMENTS

WO 2015150749 A1 10/2015
WO 2020106863 A1 5/2020

OTHER PUBLICATIONS

Brie@Darling Doodles, DIY Coin Bracelet, Jul. 17, 2013, Darling Doodles, available at << https://web.archive.org/web/20130726014622/https://www.darlingdoodlesdesign.com/2013/07/diy-coin-bracelet.html>>. (Year: 2013).

(Continued)

*Primary Examiner* — Werner G Garner
(74) *Attorney, Agent, or Firm* — Fletcher Yoder P.C.

(57) ABSTRACT

An interactive token system includes one or more interactive tokens, such as an interactive coin. The interactive token includes a display that displays one or more images. The interactive token may be releasably engaged with a slot disposed on a wearable device or an interactive token station. Once engaged, the wearable device or interactive token station is able to wirelessly communicate with the interactive token, receive information from the interactive token, display information relating to the interactive token, control actions of the interactive token, and/or use the interactive token as part of a game or trading interaction.

20 Claims, 7 Drawing Sheets

Related U.S. Application Data (60) Provisional application No. 63/036,762, filed on Jun. 9, 2020.

(51) Int. Cl.
    *G07F 5/10*     (2006.01)
    *H04B 5/72*     (2024.01)
    *H04B 5/79*     (2024.01)
    *H04W 4/80*     (2018.01)

(52) U.S. Cl.
    CPC ...... *G07F 17/3211* (2013.01); *G07F 17/3223* (2013.01); *G07F 17/3248* (2013.01); *G07F 17/3251* (2013.01); *H04B 5/72* (2024.01); *H04B 5/79* (2024.01); *H04W 4/80* (2018.02)

(58) Field of Classification Search
    CPC ......... G07F 5/10; H04W 4/80; G06Q 20/321; H04B 5/0031; H04B 5/0037
    See application file for complete search history.

(56) References Cited

U.S. PATENT DOCUMENTS

| | | |
|---|---|---|
| 8,342,929 B2 | 1/2013 | Briggs et al. |
| 8,961,312 B2 | 2/2015 | Barney et al. |
| 9,269,037 B2 | 2/2016 | Adelman et al. |
| 9,729,944 B2 | 8/2017 | Magi |
| 9,744,462 B2 | 8/2017 | Dutilly et al. |
| 10,127,775 B2 | 11/2018 | Clarebrough et al. |
| 10,150,043 B2 | 12/2018 | Zhang et al. |
| 11,052,309 B2 | 7/2021 | Barney et al. |
| 2007/0197275 A1 | 8/2007 | Gagner |
| 2012/0138682 A1 | 6/2012 | Claessen |
| 2013/0173658 A1 | 7/2013 | Adelman et al. |
| 2015/0189403 A1 | 7/2015 | Magi |
| 2015/0258458 A1 | 9/2015 | Zhang |
| 2016/0206959 A1 | 7/2016 | Nelson |
| 2016/0371751 A1 | 12/2016 | Cohen |
| 2017/0270734 A1 | 9/2017 | Geraghty et al. |
| 2018/0254637 A1 | 9/2018 | Abate et al. |
| 2019/0009168 A1 | 1/2019 | Aman et al. |
| 2019/0164177 A1 | 5/2019 | Yeh et al. |

OTHER PUBLICATIONS

PCT/US2021/036224 International Search Report and Written Opinion dated Sep. 21, 2021.

INTERACTIVE TOKEN SYSTEM

CROSS-REFERENCE TO RELATED APPLICATIONS

This application is a continuation of U.S. patent application Ser. No. 17/335,635 entitled "INTERACTIVE TOKEN SYSTEM," filed Jun. 1, 2021, which claims priority to and the benefit of U.S. Provisional Application No. 63/036,762 entitled "INTERACTIVE TOKEN SYSTEM," filed Jun. 9, 2020, which are hereby incorporated by reference in their entireties for all purposes.

FIELD OF DISCLOSURE

The present disclosure relates generally to the field of interactive collectible items. More specifically, embodiments of the present disclosure relate to systems and methods for interactive and/or functional tokens, e.g., smart coins, for use in amusement parks, events, and attractions.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Guests in amusement parks or similar entertainment facilities often enjoy purchasing themed souvenirs, such as toys or collectible items. However, such items may not be interactive or may have limited functionality within themed environments. Interactive items that are designed to operate within a certain section of an amusement park, such as with a particular ride, may not be active when guests are in other sections of the amusement park that do not share a common narrative or overall theme. Accordingly, it may be desirable to provide a collectible souvenir system with functionality or applicability across multiple sections or themed environments of an amusement park.

SUMMARY

Certain embodiments commensurate in scope with the originally claimed subject matter are summarized below. These embodiments are not intended to limit the scope of the disclosure. Indeed, the present disclosure may encompass a variety of forms that may be similar to or different from the embodiments set forth below.

In accordance with one aspect of the present disclosure, an interactive token system is provided that includes a plurality of interactive tokens. Each interactive token of the plurality of interactive tokens includes a display, a memory storing at least one image configured to be displayed on the display, and wireless communication circuitry. The system also includes a wearable device having a plurality of slots, wherein each interactive token of the plurality of interactive tokens is releasably engaged with a respective slot of the plurality of slots. The wearable device also includes wearable device wireless communication circuitry configured to communicate with the wireless communication circuitry of the plurality of interactive tokens to receive interactive token information from the plurality of interactive tokens. The wearable device also includes a controller configured to control the display of an individual interactive token of the plurality of interactive tokens based on the interactive token information to cause the image to be displayed on the display of the individual interactive token.

In accordance with one aspect of the present disclosure, an interactive token system is provided that includes an interactive token. The interactive token includes a display, a memory storing at least one image configured to be displayed on the display, and wireless communication circuitry. The system also includes an interactive token station having at least one slot configured to releasably engage the interactive token. The interactive token station also includes station wireless communication circuitry configured to communicate with the wireless communication circuitry of the interactive token to receive interactive token information from the interactive token and a station display. The interactive token station also includes a controller configured to initiate one or more actions of a game displayed on the station display based on the interactive token information; receive user input to play the game; and provide new images to the memory of the interactive token based on the user input.

In accordance with one aspect of the present disclosure, a method is provided that includes the steps of receiving a signal indicative of engagement of an interactive token within a slot; supplying power to the interactive token based on receiving the signal to cause a display of the interactive token to display one or more images stored on a memory of the interactive token; receiving interactive token information via wireless communication circuitry of the interactive token; and providing instructions to cause the display of the interactive token to transition from the one or more images to a new image based on the interactive token information

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

The present disclosure relates to an interactive token system that may be used as part of an entertainment experience, e.g., for guests of an amusement park. The interactive token system includes collectible smart tokens that may be associated with different rides, different characters, and/or different narrative sections of the amusement park, providing an interactive accompaniment to a guest's itinerary within the park. Because each guest's itinerary is variable, the interactive token system and the guest's own collection of interaction tokens is personalized to the guest's preferences and experiences. One guest may prefer collecting interactive tokens that are associated with only one narrative section of the amusement park, while other guests may enjoy collecting interactive tokens that show that the guest has visited all areas of the amusement park. Further, the interactive token system facilitates additional levels of guest-driven and guest-controlled interactions within an immersive experience. In an embodiment, certain subsets of interactive tokens may be considered to be rare or associated with special achievements, which may also be used as part of interactive experiences within the amusement park to unlock access to restricted areas.

In operation, the interactive tokens display an image or series of images (e.g., an animation) that are unique to the interactive token itself or unique to a particular type of interactive token. Accordingly, each interactive token may have different characteristics that encourage collection for guests who enjoy having souvenirs. The interactive token includes an onboard display that permits the guests and any observers to review an interactive token collection for trading or interactive uses. The interactive token system may also include a functional holder for the interactive tokens such as a wearable device worn by or carried by the guest and that is capable of communicating with each interactive token that is placed within the holder to receive interactive token information or control the interactive token displays. In an embodiment, the wearable device includes slots into which the interactive tokens can be inserted to activate one or more features of the wearable device and/or the individual interactive tokens. In an embodiment, the interactive token system may also include interactive token stations distributed throughout a geographic area. At each station, a guest can remove an interactive token from the wearable holder and insert the interactive token into a slot of the station to unlock games or retail experiences. The interactive token stations may also facilitate upgrading or unlocking of hidden features of an individual interactive token. While certain embodiments of the present disclosure are discussed in the context of an interactive token implemented as an interactive coin, other configurations, such as interactive chips, cards, or rings by way of example, are also encompassed by the present disclosure. In an embodiment, the size and shape of the interactive token may be selected to align with a particular narrative theme.

Figure 1:
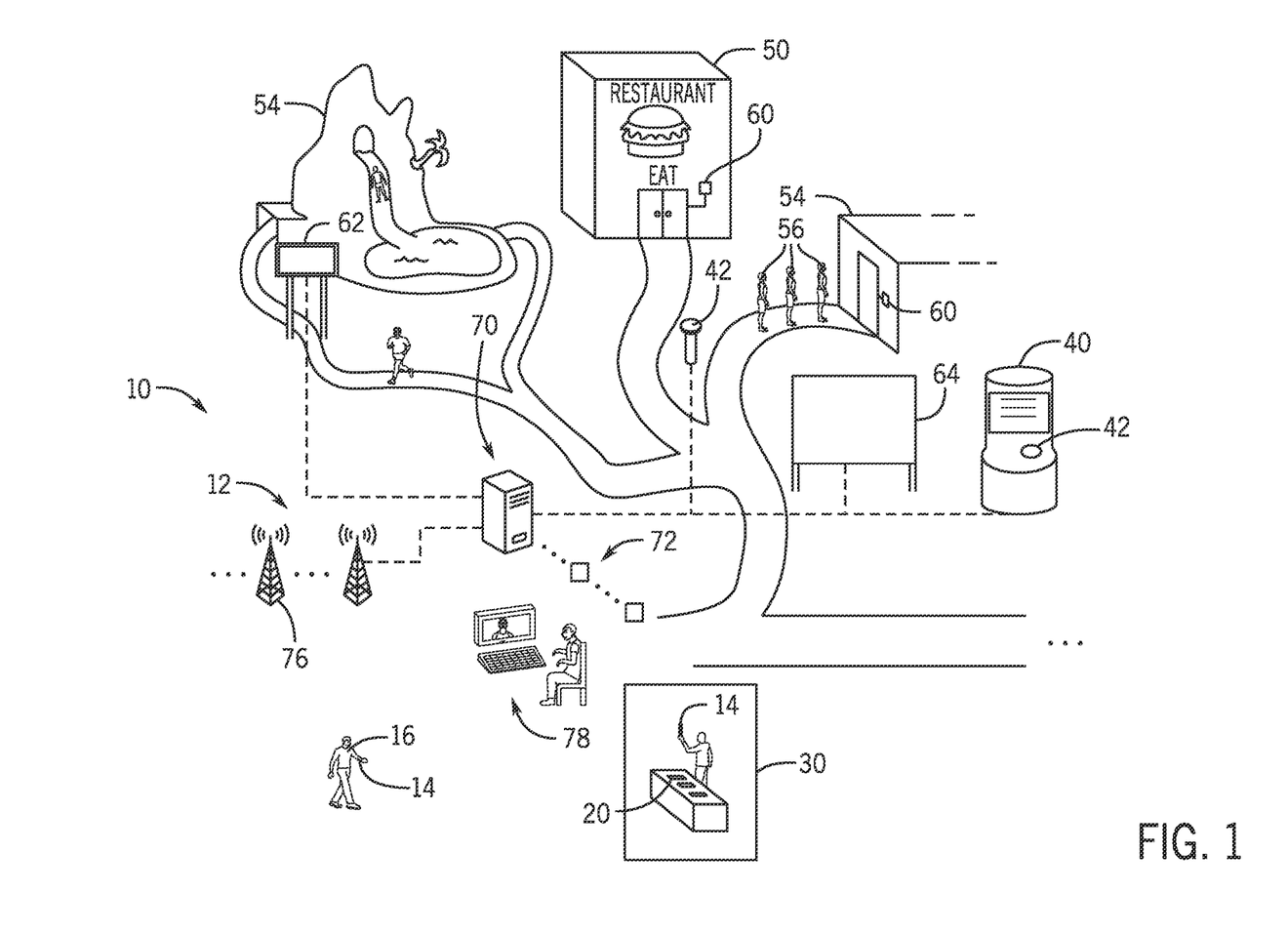
FIG. 1 is a schematic view of an amusement park including an interactive token system, in accordance with present embodiments.

FIG. 1 is a schematic representation of an amusement park 10 that incorporates an interactive token system 12. The system 12 may include wearable devices 14 associated with individual guests 16. The wearable devices 14 may operate as holders for one or more interactive tokens 20. The interactive tokens 20 and/or the wearable devices 14 may be distributed as gifts or prizes or may be purchased from a retail establishment 30. The interactive tokens 20 may be carried by the guest 16 throughout the park 10 and used in a variety of settings. For example, an interactive token may be used in conjunction with an interactive token station 40. The interactive token stations 40 may be distributed throughout the park 10. The interactive token station 40 may receive an interactive token 20 in a slot 42 to activate features of the station, such as games, as provided herein. The interactive tokens 20 may be associated with rewards that may be claimed in restaurants 50 or to access attractions 52 (e.g., rides 54, shows) and/or bypass an attraction queue 56. The interactive tokens 20 and/or the wearable devices 16 may communicate wirelessly with readers 60 at various locations in the park 10 as part of interactions that are validated by the interactive token information associated with a particular interactive token or tokens 20. In an embodiment, the readers 60 are associated with entrance gates for areas of the park 10, attraction entrances, interactive features, multiplayer game sites 64. Further, the interactive tokens 20 may mediate special effects (water sprays, bubbles, confetti) at various locations in the park. In one example, interactive token slots 42 may be distributed throughout the park 10, and insertion of the interactive token 20 into the slot 42 activates a local special effect, e.g., based on the interactive token information wirelessly communicated from the interactive token 20. Certain interactive tokens 20 may trigger different types or degrees of special effects.

The interactive token system 12 may include a central controller 70, which may be implemented as a distributed server or computer system 72. The central controller 70 may communicate with the interactive token stations 40 or the wearable devices 20 via a network, such a wireless network 76, and may permit operator input via an operator interface 78.

Figure 2:
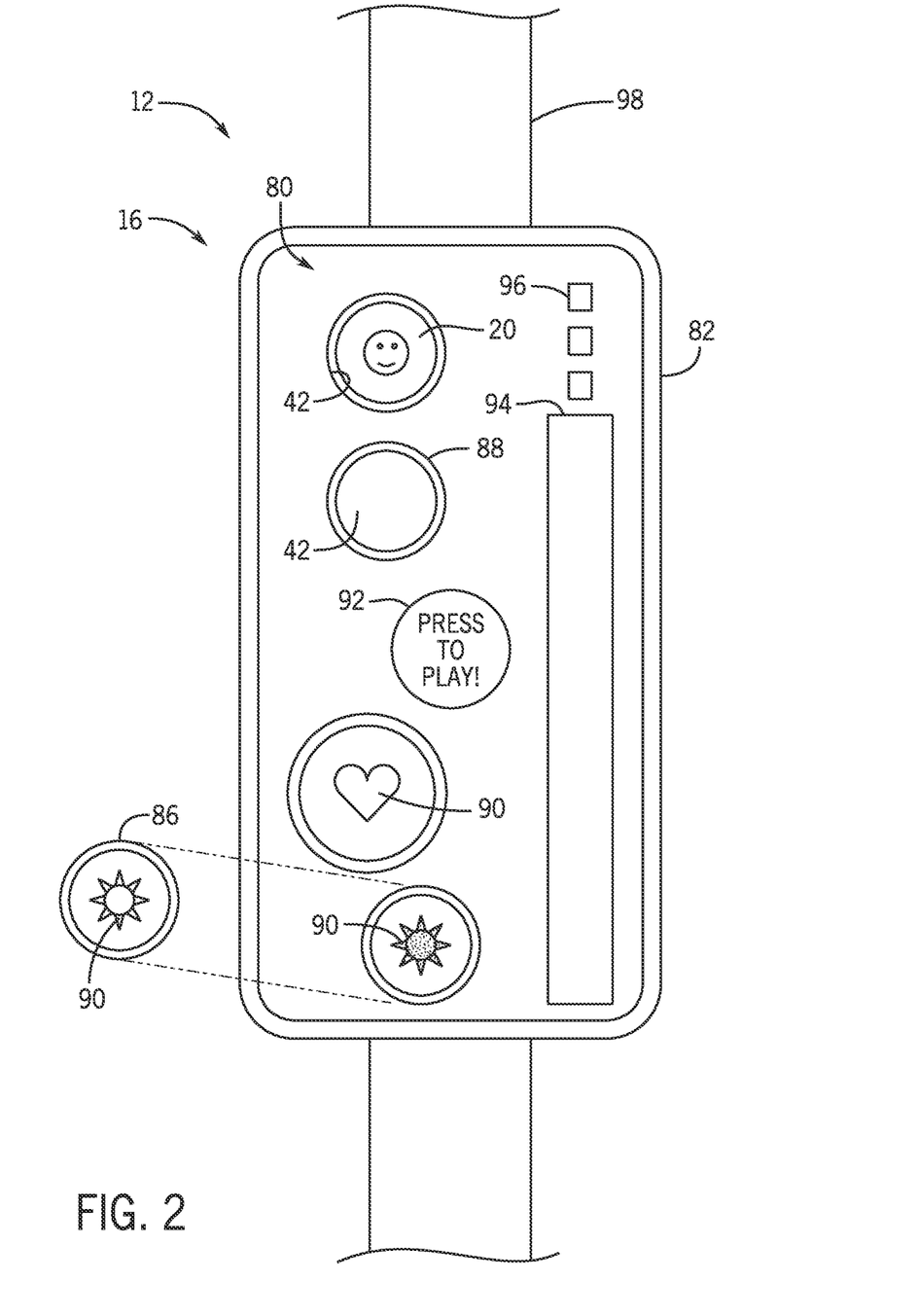
FIG. 2 is a schematic view of a wearable device of an interactive token system, in accordance with present embodiments.

FIG. 2 is a schematic illustration of a wearable device 16 including interactive tokens 20. The interactive tokens 20 may engage with corresponding slots 42 formed on or in a user-facing surface 80 of a main body 82 of the wearable device 16. The wearable device 16 may include one or more slots 42. Each slot 42 may be a same size and shape as all other slots 42 present such that any interactive token 20 can be inserted into any slot 42 or, in an embodiment, the wearable device 16 may include slots 42 of different sizes and/or shapes that are sized to receive particular types of interactive tokens 20. The interactive token 20 can be inserted into an individual slot 42 to engage the interactive token 20 with the wearable device 16 and, in one embodiment, activate certain features of the interactive token 20 as provided herein. The interactive token 20 may snap into the slot 42 and couple to one or more engagement features of the slot 42 to provide an engagement signal to the wearable device. In an embodiment, the interactive token includes a magnetic housing 86 that magnetically couples to a corresponding magnetic slot housing 88.

Each interactive token 20 includes a display 90 that displays one or more images (e.g., a still image, a short video file or animation) that are characteristic to the interactive token 20 such that a guest may collect different types of interactive tokens 20 with different images. In an embodiment, the display 90 of the interactive token 20 is active even when the interactive token 20 is not engaged with the wearable device, so that the token type is visible. In this manner, guests may select their preferred token type in a retail establishment. In another embodiment, engagement of the interactive token 20 with the wearable device 16 activates the display 90 of the interactive token so that the images are not visible until engagement, and the interactive token 20 is an idle or power-saving mode while disengaged. In such an embodiment, guests may collect tokens of unknown type and activate the interactive tokens 20 using their own wearable devices 16. As provided herein, the images may be resident on (i.e., stored on) the interactive tokens 20 to facilitate trading of or use of particular types of interactive tokens 20 in interactive environments as appropriate.

The wearable device 16 may also include a digital interactive button 92 configured as an onboard token-shaped display. The digital interactive button 92 may be used as an auxiliary token display to access stored digital tokens of a guest that are associated with a guest profile. The digital interactive button 92 may also be used as a game control input in interactive environments. The wearable device may also include a device display 94 that displays token information related to the engaged tokens as well as onboard lights 96 or other special effect devices. The wearable device 16 may include straps 98 or other attachment features that may be detachable or reconfigurable so that the wearable device 16 may be worn in a manner preferred by the guest (e.g., over the shoulder, as a bracelet, or as a necklace).

In the illustrated embodiment, the wearable device 16 is engaged with a plurality of interactive tokens 20, each having a different characteristic image or images. The wearable device may be capable of activating special features of one or more interactive tokens 20 based on a combination of the engaged interactive tokens 20. For example, having a set of interactive tokens 20 that represent visiting all sections of an amusement park may trigger activation of a special feature of one or more interactive tokens 20.

Figure 3:
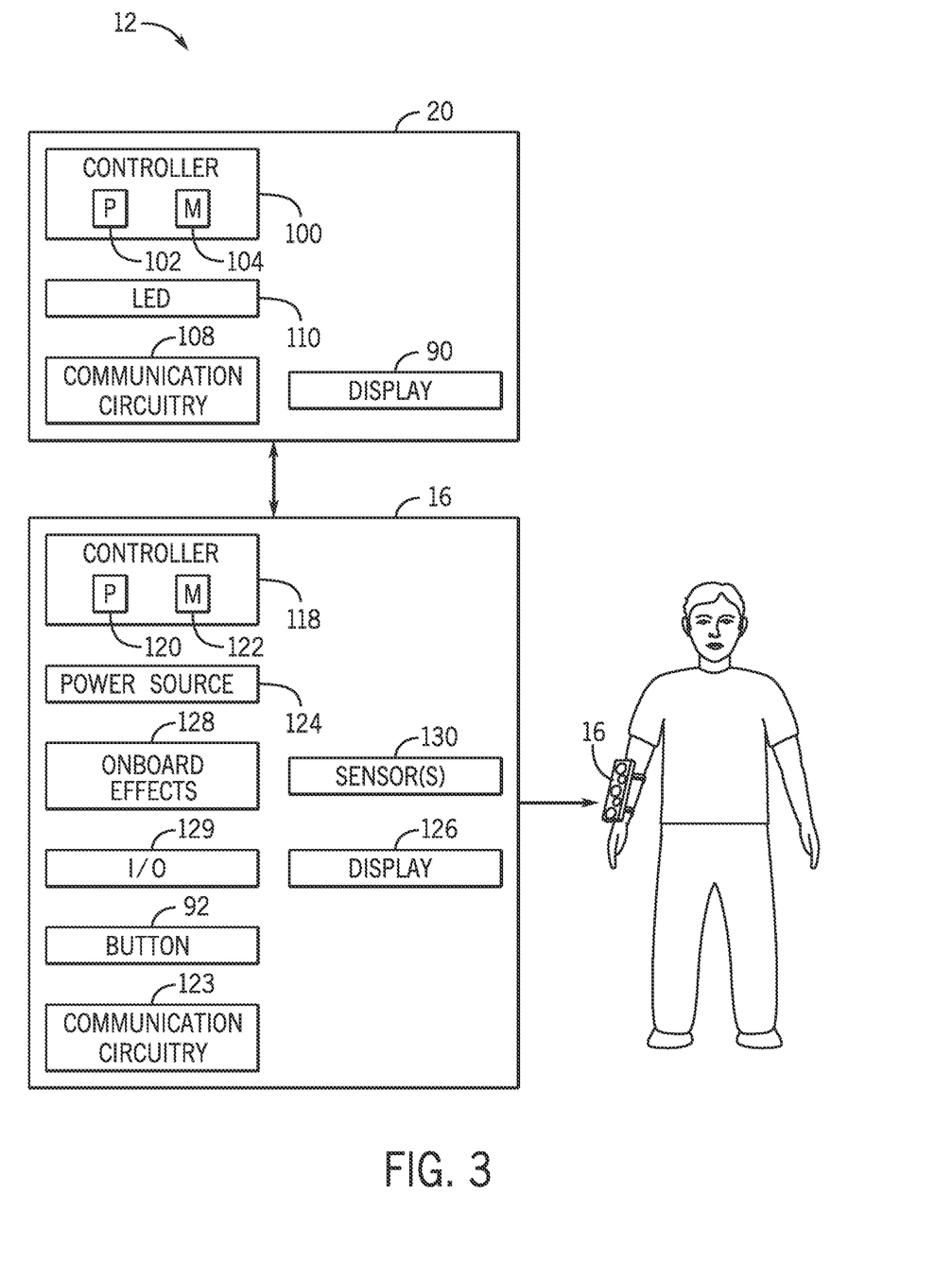
FIG. 3 is a block diagram of an interactive token and wearable device of an interactive token system, in accordance with present embodiments.

FIG. 3 is a block diagram of an interactive token system 12 that includes the wearable device 16 and at least one interactive token 20. The interactive token 20 includes the onboard display 90 and a controller 100. The controller 100 includes control circuitry to drive the display 90 and may include a memory device 104 for storing instructions executable by a processor 102 to perform the methods and control actions described herein. For example, the processor 102 may execute instructions to drive display of one or more images that are stored in the memory 104 of the interactive token 20. Further, the processor may receive signals from the wearable device 16 or other components of the system 12 to store new images in the memory 104 or to select from a library of stored images to display on the display 90.

The interactive token 20 is inserted into the slot 42 of the wearable device 16 to engage with and communicate with the wearable device 16. Engagement of the interactive token 20 within the slot 42 may trigger a mechanical sensor, complete an electrical circuit, or generate a detectable change in magnetic force that provides a signal to a controller 118 of the wearable device. Once engaged, the wearable device may activate certain functions under control of a processor 120 of the controller 118 and stored in a memory 122.

The processor (e.g., the processor 102, processor 120) may include one or more processing devices, and the memory (e.g., the memory 104, memory 122) may include one or more tangible, non-transitory, machine-readable media. By way of example, such machine-readable media can include RAM, ROM, EPROM, EEPROM, magnetic storage devices, or any other medium which can be used to carry or store desired program code in the form of machine-executable instructions or data structures and which can be accessed by the processor or by other processor-based devices. The interactive token 20 and the wearable device 16 include communications circuitry (e.g., communications circuitry 108, 123), such as antennas, radio transceiver circuits, and signal processing hardware and/or software (e.g., hardware or software filters, A/D converters, multiplexers amplifiers), or a combination thereof, and that may be configured to communicate over wireless communication paths via IR wireless communication, radio frequency transmission, Bluetooth, NFC, etc. In an embodiment, the interactive token 20 is configured to communicate using NFC with a receiver or transceiver of the communication circuitry 123 of the wearable device 16 and other components of the system 12. The wearable device 16 may include additional communications functionality to enable medium range and/or long-range communication in addition to NFC communication. In one embodiment, the interactive token 20 may include only short-range communication functionality via NFC. The display 90 may be an e-ink or other low power display, or may be an OLED display.

Engagement of the interactive token 20 may activate power to the interactive token 20 from a power source 124 of the wearable device 16. The interactive token 20 may include no onboard power or limited onboard power that is charged via engagement. The power may be used to drive the display 90 of the interactive token 90, and, in embodiments in which the interactive token 20 has internal power, may take over during engagement to preserve battery life of the interactive token 20. The power source 124 may provide wireless charging to the interactive token 20.

The wearable device 16 may also include onboard features that are functional even in the absence of interactive token engagement, such as an onboard display 126 and the digital button 92 that may function to display any digital tokens of the guest. The digital button 92 and the display 126 may be capacitive touch screen displays that respond to touch inputs. In an embodiment, the button 92 operates to receive input during an interactive game and the button may update to display different game input options. The display 126 may operate to provide game-related or token-related information. For example, each interactive token 20 may be associated with a characteristic point value. The display 126 may operate to receive the point values from the memory 104 of each interactive token 20 at the controller 118 and generate a cumulative point total on the display 126. The wearable device 16, in an embodiment, may also include onboard effect devices 128, such as LEDs, that are activated in conjunction with interactive events. The wearable device 16 may include other input/output devices 129 for user inputs, such as additional buttons, soft keys, notification devices, audio input/output devices, etc.

The wearable device 16 may also include one or more sensors 130, such as a pressure sensor, an ambient light sensor (as input to adjust display brightness), an, accelerometer, or inertial measurement unit sensor. In an embodiment, a signal from the sensor 130 drives an orientation of the display 90 on any engaged interactive tokens. The interactive token display 90, when active and when the interactive token 20 is not engaged with the wearable device 16, can be easily rotated by the user to view the displayed image or images in an upright orientation. However, when the interactive token 20 is inserted into the slot 42, rotation of the display via movement of the interactive token 20 is more difficult. Accordingly, in an embodiment, the wearable device 16 may be capable of controlling all displays 90 of the engaged interactive tokens 20 to have a same orientation. In this manner, the interactive token 20 may be placed by the user within the slot 42 of the wearable device 16 in any orientation. In the case in which the wearable device 16 is worn as a bracelet, as shown in FIG. 3, the alignment may be different than a case in which the user adopts a sash-like configuration. The signal from the accelerometer may be used to identify the correct orientation for the display of the engaged interactive tokens 20 depending on how the wearable device 16 is worn.

As provided herein, the interactive token 20, once engaged with the wearable device 16, may communicate interactive token information via the communication circuitry 108 of the interactive token and the receiving communication circuitry 123 of the wearable device. The interactive token information may include a token identity, a token status, a token point total, and/or a token image. The controller 118 of the wearable device receives the token information and may trigger activity based on the received interactive token information. In an embodiment, the activity may additionally or alternatively be based on feedback from an interactive environment that is received via the communication circuitry 123.

Figure 4:
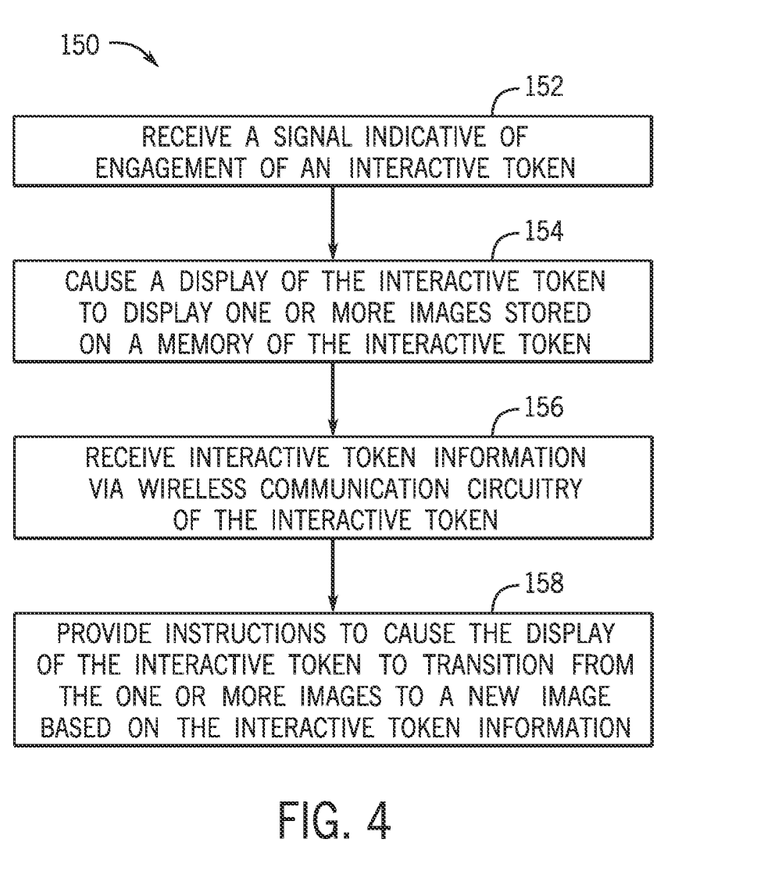
FIG. 4 is a method of activating an interactive token of an interactive token system, in accordance with present embodiments.

FIG. 4 is a flow diagram illustrating one embodiment of a process 150 for operating the wearable device 16, in accordance with present techniques. It is to be understood that the steps discussed herein are merely exemplary, and certain steps may be omitted or added, and the steps may be performed in a different order. In one embodiment, the steps of the process 150 may be executed by the wearable device 16, the interactive token 20, and/or other components of the system 12, such as an interactive token station 40.

The process includes a step of receiving a signal of indicative of engagement of an interactive token 20 in a slot, e.g., the slot 42 of the wearable device 16 or the interactive token station 40 (block 152). The signal may be an engagement signal based on physical sensing. In another embodiment, the engagement may be based on receiving wireless signals from the interactive token 20 being moved to an in-range position such that the wearable device 16 receives NFC signals from the interactive token 20. Receiving the signal may cause activation of the interactive token 20 such that the display 90 of the interactive token is activated to display one or more images that are stored on the memory 104 of the interactive token 20 (block 154). The received signal from the NFC communication circuitry may include token information that is received by the controller 118 of the wearable device 16 (block 156). Based on the token information, the controller 118 generates a control signal that is communicated to one or more of the interactive tokens 20 to alter the display 90 (block 158). The control signal may include new images that are written to the memory 104 and that are accessed and displayed on the display 90. The control signal may include instructions to access images stored in the memory 104 or to select an image or images from an existing library stored on the memory 104 for display on the display 90.

In one example, the controller 118 receives interactive token information relating to the combination of interactive tokens 20 engaged with the wearable device 16. Based on the combination, the controller may execute instructions to transition an existing image on the display of one or more interactive tokens 20 to a new image. The logic for assessing the combination may be resident on the controller 118 or may be resident on a central controller in wireless communication with the wearable device 16. The combination may be a set of particular characters or places. Based on the presence of a particular combination, one of interactive tokens 20 may transition to a new image. For example, the interactive token 20 associated with a particular character may transition to an image associated with a new version of the character. In another example, the combination may cause some or all of the interactive tokens 20 to temporarily display a reward indication for an upgraded status in a ride or a clue that is part of an interactive game. The transition to the new display may be time-limited.

Figure 5:
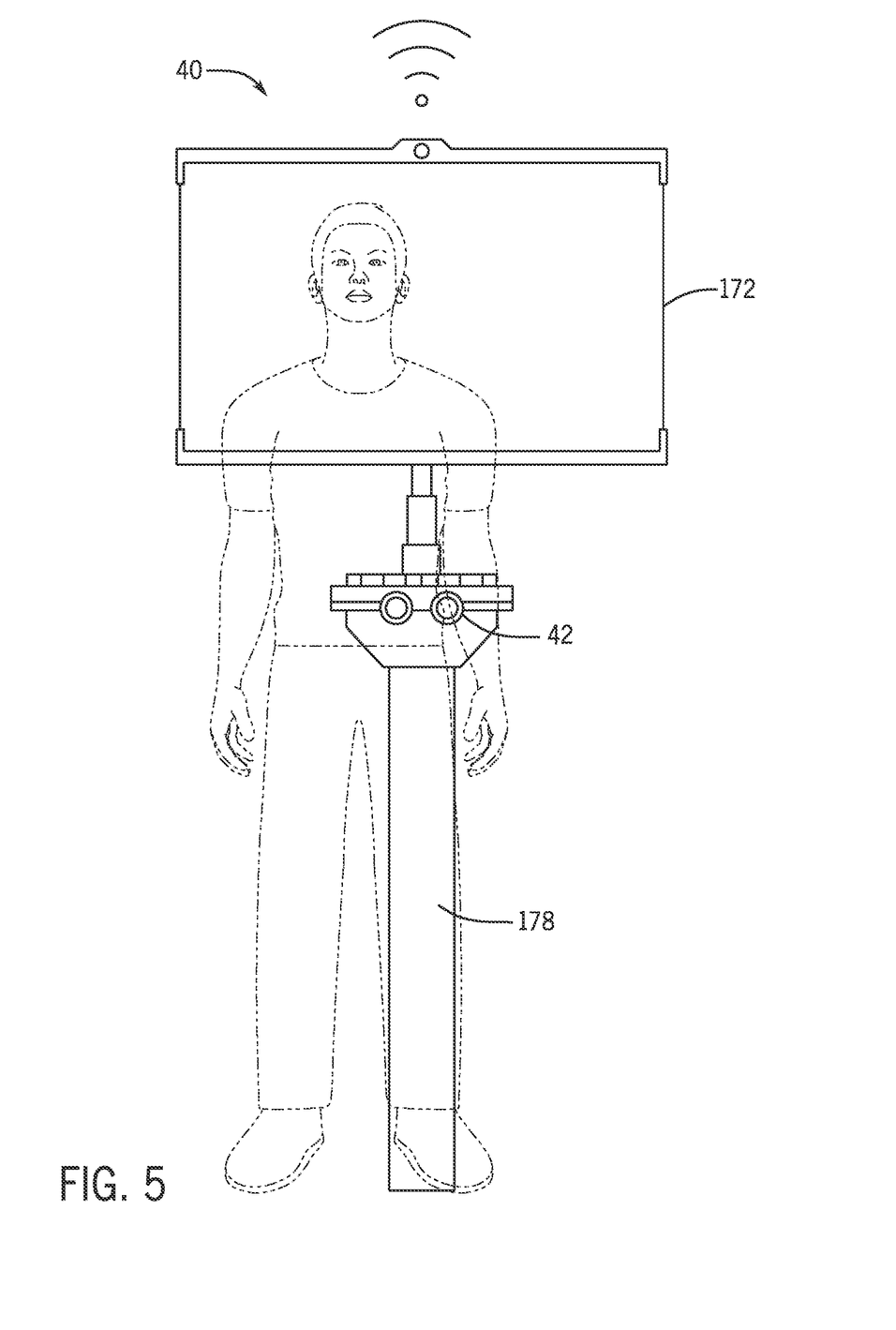
FIG. 5 is a schematic illustration of an interactive token station of an interactive token system, in accordance with present embodiments.

The interactive tokens 20 may be used in conjunction with interactive token stations 40 that are distributed in various locations within a theme park or entertainment venue. An example interactive token station 40 is illustrated in FIG. 5. In the depicted embodiment, a guest can insert the interactive token into the slot 42 to initiate a game on the display 172. The interactive token station may include a post 178 that houses the hardware associated with reading the interactive token 20 and communicating with the central controller, either in a wired or wireless manner. Based on the token information from the interactive token 20, the interactive token station 40 selects the game associated with the particular token 20. For example, if the token is part of a particular themed environment, the interactive token station 40 selects a game that has the same theme. The guest can interact with the game via inputs on the post 178, inputs on the display 172, or via the guest's wearable device 16. Further, the interactive token 20 may be a character token, and the guest avatar may be based on the character. Certain games may permit multi-player interaction with multiple tokens 20 received in the slots 42. Based on the game outcome, the station 40 may write to the interactive token 20 to store new images or rewards on the guest's interactive token 20 or to increase a point total associated with the interactive token 20. When the game play is finished, the guest removes the interactive token 20 from the slot 42, and the interactive token station may display other park-related information.

Figure 6:
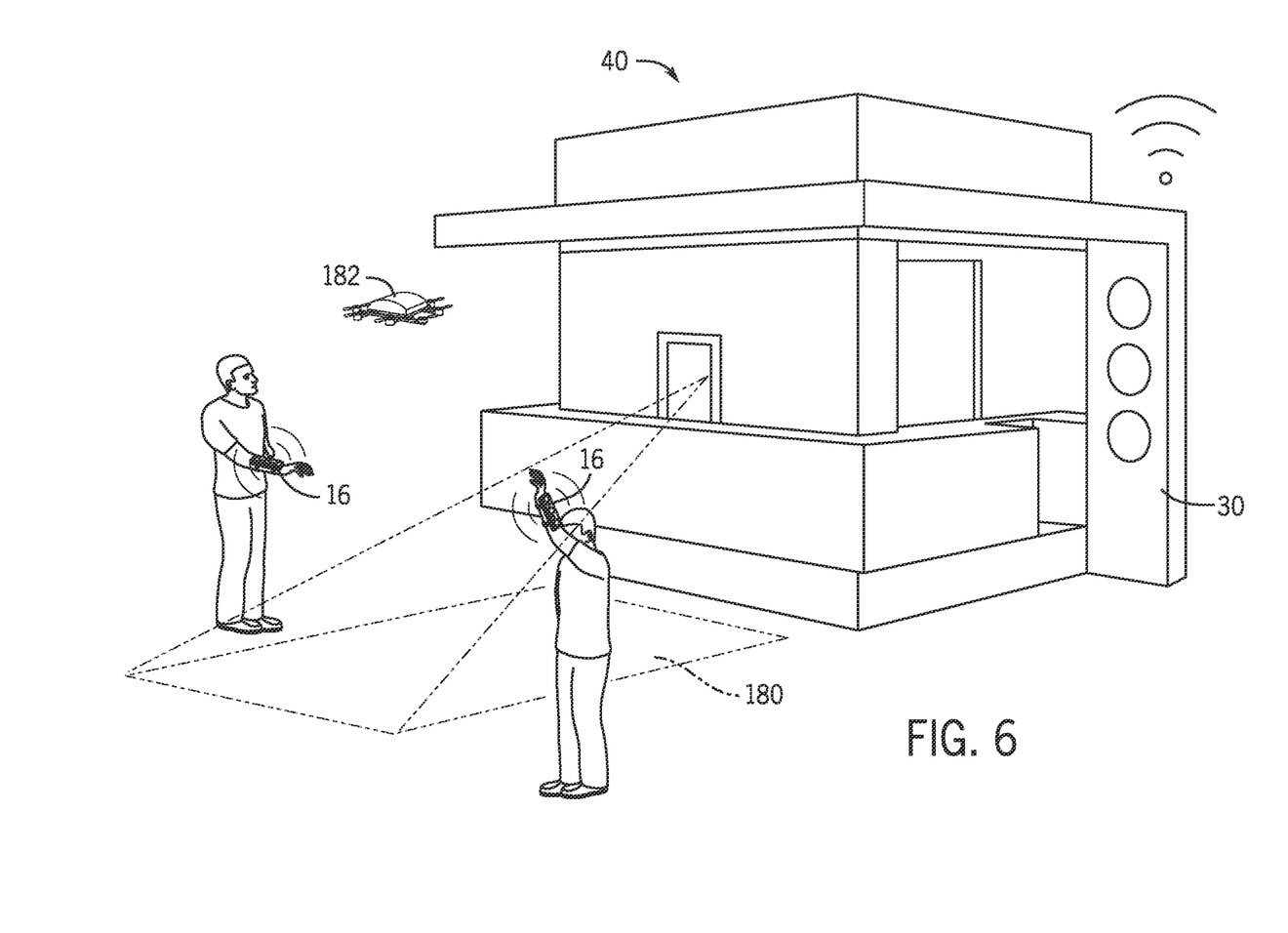
FIG. 6 is a schematic illustration of an interactive token trading station of an interactive token system, in accordance with present embodiments.

The interactive token station 40 may also be configured as a retail space 30, a trading station, and/or multi-player gaming space, as illustrated in FIG. 6. Guests who wish to battle one another in a game environment 180 may use their wearable devices 16 to control the movement of real-world game elements, illustrated here as an unmanned aerial vehicle 182.

Figure 7:
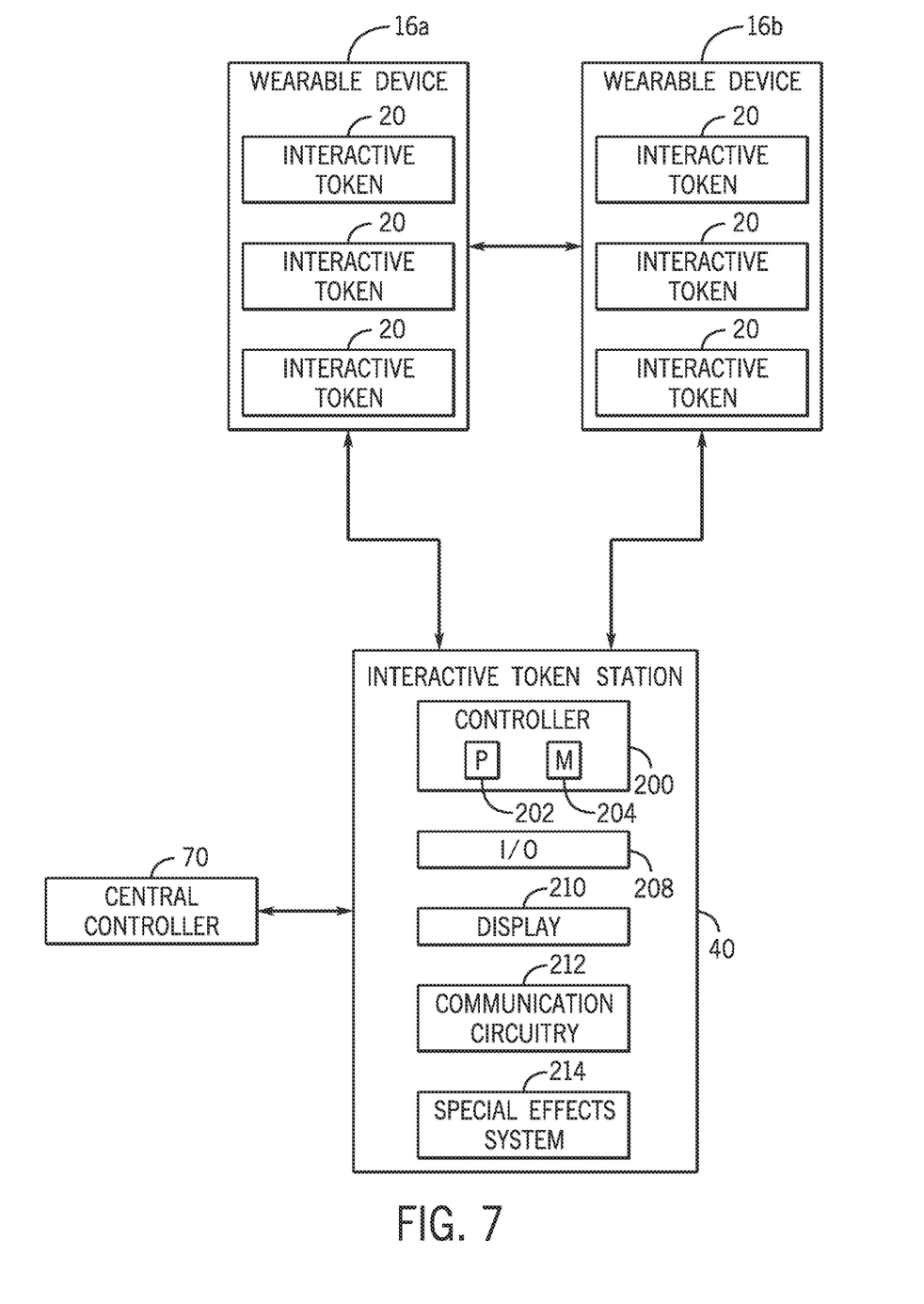
FIG. 7 is a block diagram of an interactive token system, in accordance with present embodiments.

FIG. 7 is a block diagram of the system 12 showing interaction between various components of the system 12. In the illustrated embodiment, wearable devices 16a, 16b of different guests may communicate via Bluetooth or wireless communication to facilitate the trading or gaming interactions disclosed herein. The wearable devices 16a, 16b may also communicate with the interaction token station 40, or may communicate directly with the central controller 70 over a wireless network. The guest associated with the wearable device 16a may have a user profile indicating a desire to collect and/or trade particular interactive tokens 20. The central controller 70 may identify when another guest, with wearable device 16b, having the interactive token 20 of the desired type is within a preset geographic distance. The central controller may send alerts to both guests, who are instructed to proceed to a nearest interactive token station 40. The interactive token station 40 may mediate any potential trade, and may award points to both guest profiles upon agreement to the trade.

The interactive token station 40 may include a controller 200 with a processor 202 and a memory 204 as well as input/output devices 208, a display 210, and communication circuitry 212. In one example, the interactive token station 40 includes the slot 42 (FIG. 5) to receive the token. Based on the interactive token information read from the interaction token 20, the station 40 provides instructions to activate a local special effect using a special effect system 214. In one example, the special effect is a water spray effect. If the interactive token 20 has a high point total, the spray may be larger than for interactive tokens 20 with lower point totals. That is, the control of water jet force settings of the special effect system 214 is based on a point total of the interactive token 20. In another example, the special effect is selected from multiple potential effects based on a category of the interactive token 20. If the interactive token 20 is a villain character, a smoke or fire effect may be activated. If the interactive token is hero character, a bubble or light special effect may be activated. The interactive token station 40 may serve as an access point to a restricted area, and may permit access only for certain types of interactive tokens 20. It should be understood that different interactive token stations 40 may have different functionality, and may include more or fewer components than disclosed in FIG. 7.

While only certain features of the invention have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interactive token system, comprising:
   an interactive token configured to be disposed in a releasable slot of a wearable band, wherein the slot comprises a slot housing, the interactive token comprising:
   a display;
   a memory storing at least one image configured to be displayed on the display and interactive token information; and
   token wireless communication circuitry; and
   an interactive token station, comprising:
   at least one slot configured to receive and releasably engage the interactive token;
   station wireless communication circuitry configured to communicate with the token wireless communication circuitry of the interactive token to receive the interactive token information from the interactive token when the interactive token is engaged in the at least one slot; and
   a controller configured to:
   receive the interactive token information from the wireless communication circuitry; and
   generate instructions to activate a special effect based on the interactive token information.

2. The system of claim 1, wherein the instructions comprise selecting the special effect based on the interactive token information.

3. The system of claim 2, wherein the special effect is selected based on a category of the interactive token in the interactive token information.

4. The system of claim 2, wherein the special effect is selected from a plurality of special effects.

5. The system of claim 2, wherein the special effect is selected from a water effect, a bubble effect, and a smoke effect.

6. The system of claim 1, wherein the instructions comprise controlling settings of a jet of a special effect system.

7. The system of claim 6, wherein the settings are configured to control a degree of the special effect.

8. The system of claim 6, wherein the settings comprise force settings of a spray.

9. The system of claim 6, wherein the settings are configured to be controlled based on a point total indicated in the interactive token information.

10. An interactive token system, comprising:
    at least one slot of an interactive token station configured to receive and releasably engage an interactive token into a slot housing such that the slot housing is disposed around a housing of the interactive token while the interactive token is engaged;
    wireless communication circuitry configured to wirelessly communicate with communication circuitry of the interactive token to receive interactive token information from a memory of the interactive token when the interactive token is engaged in the at least one slot; and
    a special effect system processor configured to activate a special effect according to special effect instructions stored in the memory; and
    a controller configured to:
    receive the interactive token information from the wireless communication circuitry; and
    generate the special effect instructions to activate the special effect based on the interactive token information.

11. The system of claim 10, wherein the interactive token information comprises a point total, and wherein the special effect instructions are generated based on the point total.

12. The system of claim 10, comprising a jet configured to release a fluid when the special effect is activated.

13. The system of claim 10, wherein the special effect system processor is configured to activate a smoke effect or a fire effect.

14. The system of claim 10, wherein the special effect instructions are configured to control settings of the special effect.

15. The system of claim 14, wherein the settings are configured to control a degree of activation of the special effect.

16. A method, comprising:
    receiving a first signal indicative of engagement of a first interactive token within a housing of a slot of one or more slots formed in an interactive token station;
    receiving first interactive token information via wireless communication circuitry of the first interactive token;
    generating first special effect instructions based on the first interactive token information; and activating a first special effect based on the first special effect instructions.

17. The method of claim 16, comprising:
receiving a second signal indicative of engagement of a second interactive token within the housing of the slot of the one or more slots;
receiving second interactive token information via wireless communication circuitry of the second interactive token;
generating second special effect instructions based on the second interactive token information; and
activating a second special effect based on the second special effect instructions.

18. The method of claim 17, wherein the second special effect is different than the first special effect.

19. The method of claim 18, wherein the second special effect is a different type of special effect than the first special effect.

20. The method of claim 18, wherein the second special effect instructions comprise a different degree of activation relative to the first special effect instructions.

\* \* \* \* \*